United States Patent [19]

Bujese

[11] Patent Number: 4,921,772

[45] Date of Patent: May 1, 1990

[54] TWO DIRECTIONALLY OPERATING IMAGING SYSTEM

[75] Inventor: David P. Bujese, Butler, N.J.

[73] Assignee: Olin Corporation, Cheshire, Conn.

[21] Appl. No.: 178,652

[22] Filed: Apr. 7, 1988

[51] Int. Cl.$^5$ ........................ G03G 13/14; B32B 27/08

[52] U.S. Cl. ........................................ 430/126; 355/274

[58] Field of Search .................. 430/126; 355/271, 274

[56] References Cited

U.S. PATENT DOCUMENTS

| | | | |
|---|---|---|---|
| 4,182,266 | 1/1980 | Alston | 118/621 |
| 4,245,555 | 1/1981 | Alston | 101/466 |
| 4,708,460 | 11/1987 | Langdon | 430/126 |
| 4,763,157 | 8/1988 | Bujese | 355/37 R |

*Primary Examiner*—John L. Goodrow
*Attorney, Agent, or Firm*—Ralph D'Alessandro

[57] ABSTRACT

A method and the apparatus to perform the electrostatic transfer of a developed image from a permanent master to a receiving surface are provided whereby in a first generally horizontal direction the image is charged and developed and in an opposing second direction the developed image is transferred to a receiving surface and the master is cleaned. The master is electrostatically picked up and retained on flexible carrier means which are first moved in the first direction prior to the image transfer and then traversed by a transfer roller moving in the opposing second direction to effect the electrostatic pickup.

37 Claims, 7 Drawing Sheets

TWO DIRECTIONALLY OPERATING IMAGING SYSTEM

BACKGROUND OF THE INVENTION

This invention relates generally to the apparatus and method used to electrostatically develop and transfer the developed image to a receiving surface. More specifically, it pertains to the use of a method and apparatus that transports a master in a first direction, while applying a charge and developing the charged master with toner particles, and in the second direction transfers the developed image to the receiving surface from a stationary master. The master is cleaned while the master returns in the second direction. The method and apparatus are used in the transfer of a high resolution image to a receiving surface in either a single or multiple imaging mode.

The permanent master and the substrate supporting the permanent master are used as part of a system to repeatedly produce high resolution and high quality images on receiving surfaces. These receiving surfaces can be conductive, such as printed circuit boards, or nonconductive, such as paper or plastic which may be used in color graphic applications. Conductive receiving surfaces, such as printed circuit boards, have traditionally been produced by individually laminating, exposing, developing, etching and stripping processes where dry film photoresist has been used to produce the conductive wiring patterns. Previously, however, there has been no method or apparatus available to produce a plurality of copies of conductive wiring patterns from a single master copy of the desired wiring pattern utilizing photoimaging and a photopolymer in an apparatus that occupied a relatively small "footprint" in a manufacturing environment. There are many other factors which have prevented this type of system from being employed in manufacturing multiple copies from a single master.

Similarly, the use of an apparatus and method employing a photopolymer in conjunction with nonconductive receiving surfaces, such as those used in color graphics, has not previously been possible in a small "footprint" apparatus that provided high speed and high quality copies. Offset lithography has utilized an apparatus and method that employs two directionally operating image transfer systems with a transfer roller.

The ability to precisely position the master on the supporting substrate and to accurately and repeatedly position it on or over the receiving surface to obtain the necessary tolerances and repeated copies has been a continuing problem.

These problems are solved in the design of the present invention which utilizes a two directionally operating apparatus and method to charge and develop the master in a first direction and transfer the developed master in a second direction.

Summary of the Invention

It is an object of the present invention to provide an apparatus that carries an electrostatic master on a supporting substrate as the apparatus moves in a first direction applying a charge and developing the charged master and in the second direction transferring the developed image on the master.

It is another object of the present invention to provide a method to charge and develop an electrostatic master while the apparatus moves in a first direction and to transfer the developed electrostatic master while transfer apparatus retraces its path and moves in a second direction.

It is a feature of the present invention that the electrostatic master is electrostatically retained on a flexible carrier substrate and is held stationary in a fixed and registered position with no relative motion between the master with the image to be transferred and the receiving surface in the horizontal X and Y planes during image transfer.

It is another feature of the present invention that the only movement between the master with the image to be transferred and the receiving surface is in the vertical direction when the transfer roller brings the carrier substrate toward the receiving surface.

It is another feature of the present invention that the electrostatic master is charged as it passes over a charging apparatus and then is developed as it passes over a developing or toning station as the master moves in the first direction.

It is still another feature of the present invention that the electrostatic master has a developed image transferred to the receiving surface over a stationary receiving station as it moves back into the second direction.

It is yet a further feature of the present invention that the electrostatic master is cleaned as the master retraces its travel in the second direction.

It is an advantage of the present invention that the electrostatic image transfer is fast and simple.

It is another advantage of the present invention that the developed image that is electrostatically transferred possesses high resolution.

It is still another advantage of the present invention that the apparatus employed in making the electrostatic transfer occupies a relatively small area or floor space.

These and other objects, features and advantages are obtained by the use of a method and apparatus that carries an electrostatic master and a supporting substrate, charging and developing the charged master as the apparatus moves in the first direction and transferring the developed image on the master as it retraces its path of movement in the second direction. The electrostatic master is cleaned as the master travels in the second direction.

BRIEF DESCRIPTION OF THE DRAWINGS

The objects, features and advantages of the present invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
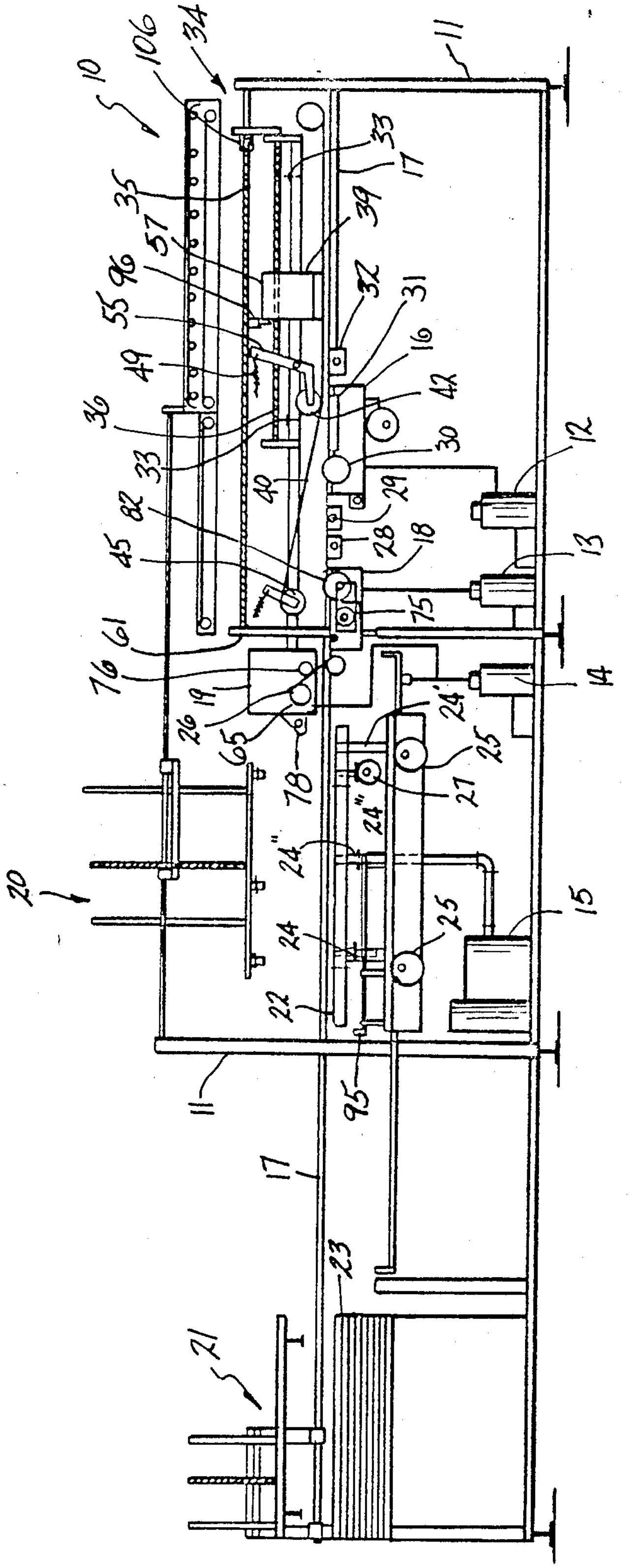
FIG. 1 is a side elevational view of the apparatus used to transfer electrostatically developed images from the master that is retained on the flexible substrate to a receiving surface.

FIG. 1 shows a side elevational diagrammatic illustration of the electrostatic imaging apparatus, indicated generally by the numeral 10. Apparatus 10 has a support frame 11 to which are mounted toner tank assembly 12, cleaning station tank and feed line assembly 13, nonpolar insulating solvent tank assembly 14, and vacuum pump assembly 15. Each of the tank assemblies 12, 13 and 14 have appropriate hoses and pumps to either distribute the toner to the toning station 16 or the nonpolar insulating solvent to the master cleaning station 18 and wicking station 19, respectively. Apparatus 10 at the infeed end has a board feeder unit 21 which picks up individual conductive receiving surfaces 23, such as copper boards, or nonconductive materials depending upon the application, by appropriate means, such as suction or vacuum pickup, and transports it along guide rails 17 to a board receiving station or stationary platen 22, where it is correctly positioned by alignment pins 24. After image transfer to the conductive receiving surface 23 has been completed, a board pickup unit 20 removes the imaged receiving surface 23 from the platen 22 in preparation for receipt of the next receiving surface 23 for imaging.

A permanent master is used to produce the desired image on each copper board 23. The permanent master is a multiple layered structure having a base layer of a suitable flexible and non-conductive plastic, such as a polyethylene terephthalate sold under the tradename Mylar®, which is coated with an electrically conductive layer, such as a silver or aluminum layer, and a layer of photosensitive material, such as dry film or liquid photoresist. The permanent master is produced by exposing the desired pattern, such as through a mask, to actinic radiation. The exposed pattern on the electrostatically imageable surface of the master, once thus cross-linked, creates a persistent latent image with permanently increased electrical resistivity. This latent image will hold an electrostatic charge when exposed to a charging apparatus, such as corona 32. The charged latent image attracts the toner particles of an appropriate toner when the master 48, with the image thereon, is passed through toning station 16.

Figure 2:
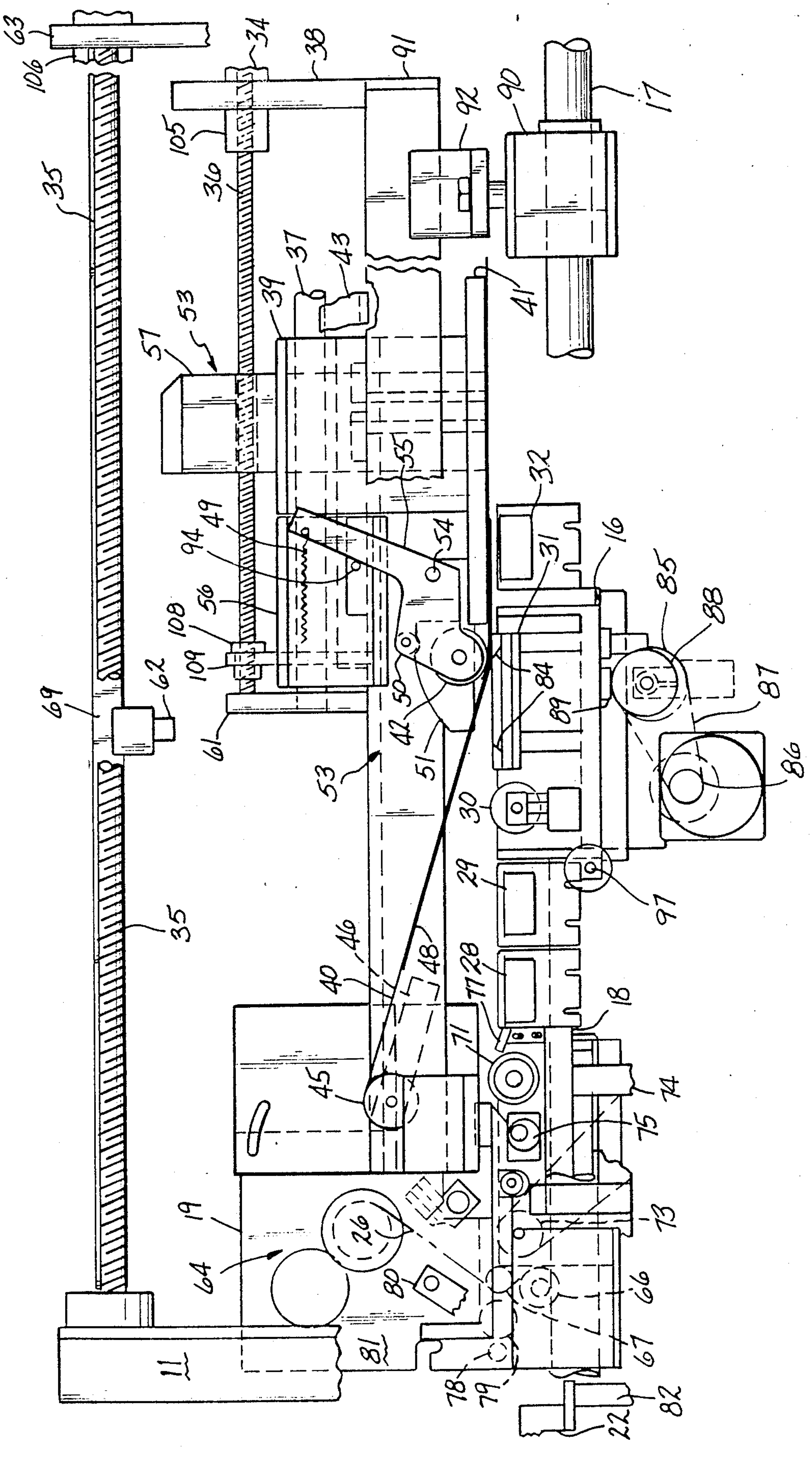
FIG. 2 is an enlarged side elevational view of the apparatus used to effect the transfer of the image at the beginning of the imaging cycle during charging.

The master, seen as 48 in FIG. 2, is placed on a stationary platen 22 of FIG. 1 with the photosensitive surface down prior to the picking up of any of the conductive receiving surfaces 23. Previously an alignment template (not shown) has been used to adjust all of the alignment pins 24, 24', 24'', and 24''' to fit within the holes in the heavy metal template that is placed over the raised pins on the platen 22. The position of alignment pins 24, 24', 24'', and 24''' may be adjusted by means of adjustment screws (not shown) beneath platen 22.

Once proper adjustment has been achieved, the template is removed and the master registration process is accomplished. First a dummy receiving surface or punch guide (not shown) is placed on the platen 22. This surface is the same thickness as the receiving surfaces 23 which will be employed during the actual image transfer process. The dummy receiving surface has a plurality of vacuum holes (not shown) about its perimeter. The permanent master 48 has previously had its photosensitive surface exposed to obtain the difference in electrical resistivity required for the process by the cross-linking of the exposed surface area to obtain the permanent latent image desired. Alignment pins 24 are then raised to register the master 48 and the dummy receiving surface to the platen 22. Alignment pins 24 register the master 48 to the platen through an adaptation of the standard four (04) slot system. This adaptation results in a "T" design that utilizes 3 slots and the corresponding pins 24, along one edge and a single slot and pin 24 at the base of the "T". This permits two sides of a receiving surface 23 to be precisely imaged, such as with dual sided circuit boards, even when two different masters are used and to permit variable width receiving surfaces 23 to be used. This "T" design pin arrangement simplifies the registration system.

Alignment pins 24, 24'', 24'' and 24''' comprise four sets which may be selected by cam control rods 95, only one of which is shown in FIG. 1, depending on the size of the surface to be registered. The alignment pins 24 are used to register the 24"×30" long master to the receiving surface. The master 48 is always the same size to ensure that the full width of the carrier means 40, preferably in the form of a web, is covered to prevent the buildup of contaminants between the master 48 and the carrier web means 40. By selection of the appropriate alignment pins 24, 24', 24'' and 24''' receiving surfaces 23 of a width of 12 inches, 16 inches, 18 inches or 24 inches, for example, may be selected and registered on the platen 22 for either 18 or 24 inch length boards. Alignment pins 24 and 24' are always actuated regardless of the size of the receiving surface.

Once properly registered by having the pins position and retain the master 48 and the dummy receiving surface (not shown) in position, the vacuum pump apparatus 15 is activated to hold both the dummy receiving surface and the master 48 in place. Perimeter vacuum holes in the dummy receiving surface permit the suction to retain the master 48 in its proper position through the dummy receiving surface. Platen 22 has a plurality of holes (not shown) which permits the vacuum pump assembly 15 to suction out the air from the platen vacuum chambers (not shown) from beneath the dummy receiving surface to hold it in place. Alignment pins 24 thus assure that the master 48 is properly positioned on the stationary platen 22 via the use of pin contact plate cams 25, dielectric cam contact blocks 90 and pin contact plate 94, best seen in FIGS. 1 and 6, or other appropriate apparatus. Alignment pins 24, 24', 24'' and 24''' prevent movement of the master 48, as well as the receiving surface 23 after the master 48 is picked up by the carrier means 40, in the horizontal direction in the X and Y planes, on the stationary platen 22.

The master 48 is then picked up by the carrier means 40 by having the master transport assembly, indicated generally by the numeral 34, move over the platen 22 being driven along guide rails 17 by master transport assembly drive motor 106 and the main drive screw shaft 35 of FIG. 1. The master transport assembly 34 is aligned and registered to the master 48 and platen 22 by the engagement of alignment pins 33 of FIG. 1 on the master transport assembly 34 with the pin receptacles (not shown). Alignment pins 33 are raised or lowered by air cylinders 102 (one of which is seen in FIG. 5). Once lowered, the pins 33 register the master transport assembly 34 with the carrier means 40 to the platen 22 and prevent movement in the horizontal direction in the X and Y planes. As seen partially in FIGS. 2–7, master transport assembly 34 travels along guide rails 17 via transport assembly bearings 90 (only one of which is shown). Bearings 90 are connected by support brackets 92 and an appropriate fastener, such as a bolt or pin, to transport assembly support members 91 (only one being shown for all of the items).

An electrical charge is supplied to the carrier web means 40, which is formed from the aforementioned flexible, non-conductive material having a conductive coating. The electrical charge is carried by the conductive coating and creates the electrostatic force which picks up and holds the master 48 on the carrier web means 40. The master transport assembly 34, with the master 48 held in place on the carrier web means 40 as seen in FIG. 2, then returns to the start position shown in FIG. 1.

A conductive receiving surface 23, such as a copper circuit board which is preferably two-sided, is placed on the platen 22 of FIG. 1 and is registered so it will be precisely aligned with the master 48 by the alignment pins 24 that are positioned by means of cams 27, or other appropriate apparatus. The position of the platen 22 can be controlled by any appropriate apparatus, such as cams 25, if necessary. Dielectric standoffs 82 (seen in FIGS. 5 and 6) can be used to electrically isolate platen 22.

The master transfer assembly 34, once the receiving surface 23 is properly positioned on platen 22, carries the carrier web means 40 and the master 48 in a first direction toward the platen 22. The master 48, as seen in FIGS. 2–7, passes over the charging corona 32, which charges the permanent latent image on the master 48, and then passes over the development or toning station 16, which includes reversing roller 30 and development toner electrode 31, to develop the permanent latent image. Toner is fed out of the slots 84 at an angle to ensure the surface of the development electrode 31 is completely coated during development of the master 48. The toner is pumped from the toner tank assembly 12 of FIG. 1. Reversing roller 30 is appropriately driven, such as by a pair of reversing roller drive sprockets that are in turn driven by a drive motor and drive chains, all not shown. A spur gear (not shown) may be used with the drive sprocket to drive reversing roller 30.

Figure 3:
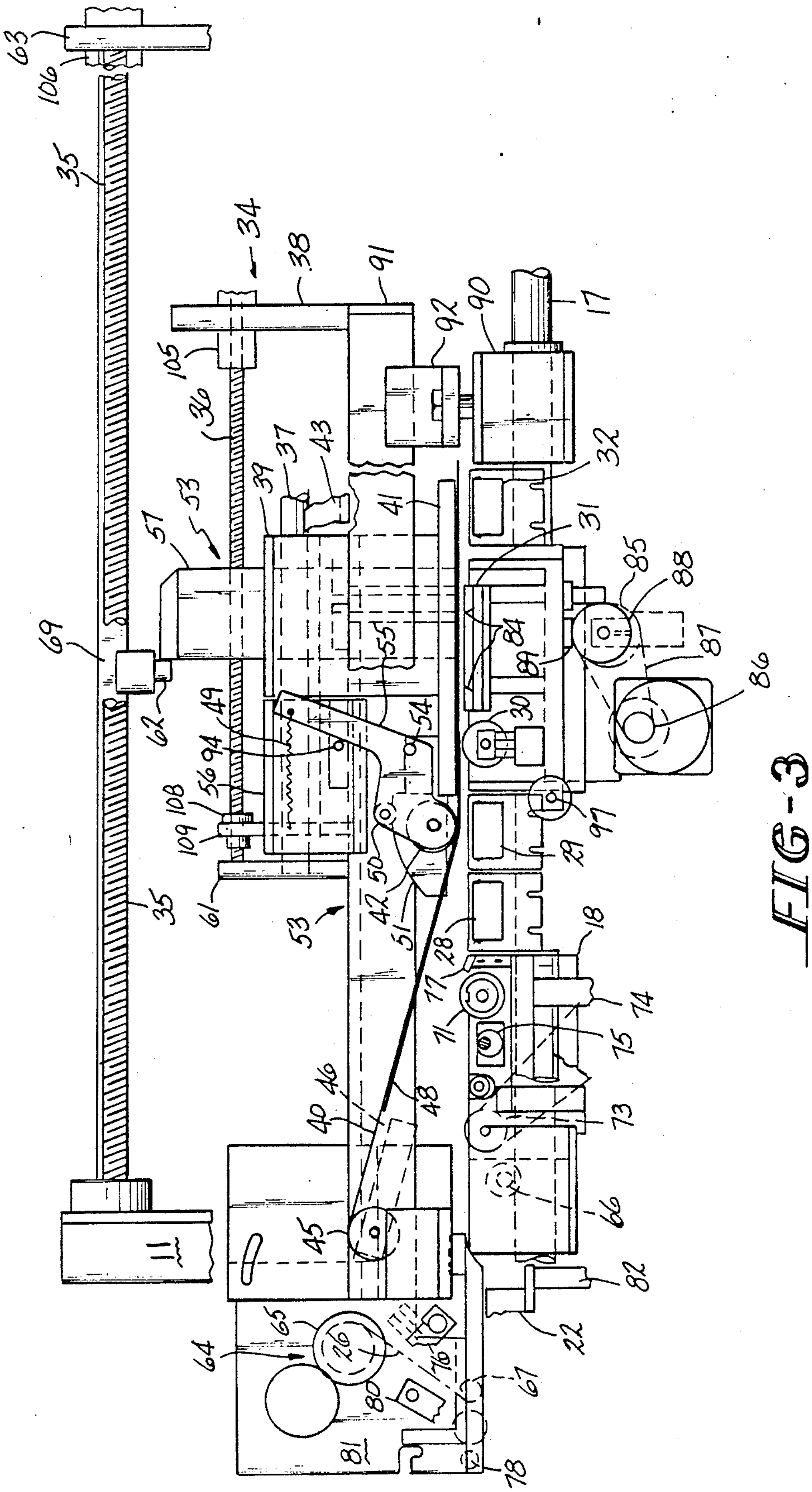
FIG. 3 is an enlarged side elevational view of the apparatus at the beginning of the development cycle of the electrostatic master.
Figure 4:
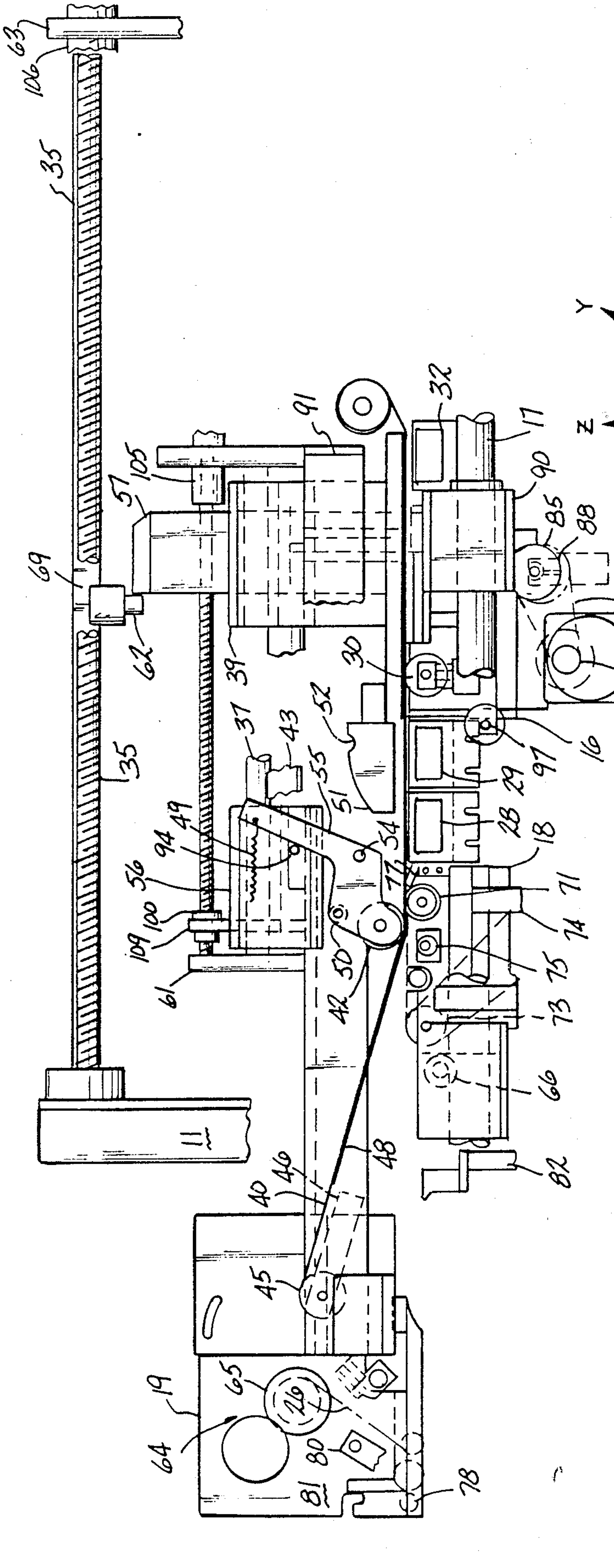
FIG. 4 is an enlarged side elevational view of the apparatus at the end of the development cycle of the electrostatic master.
Figure 5:
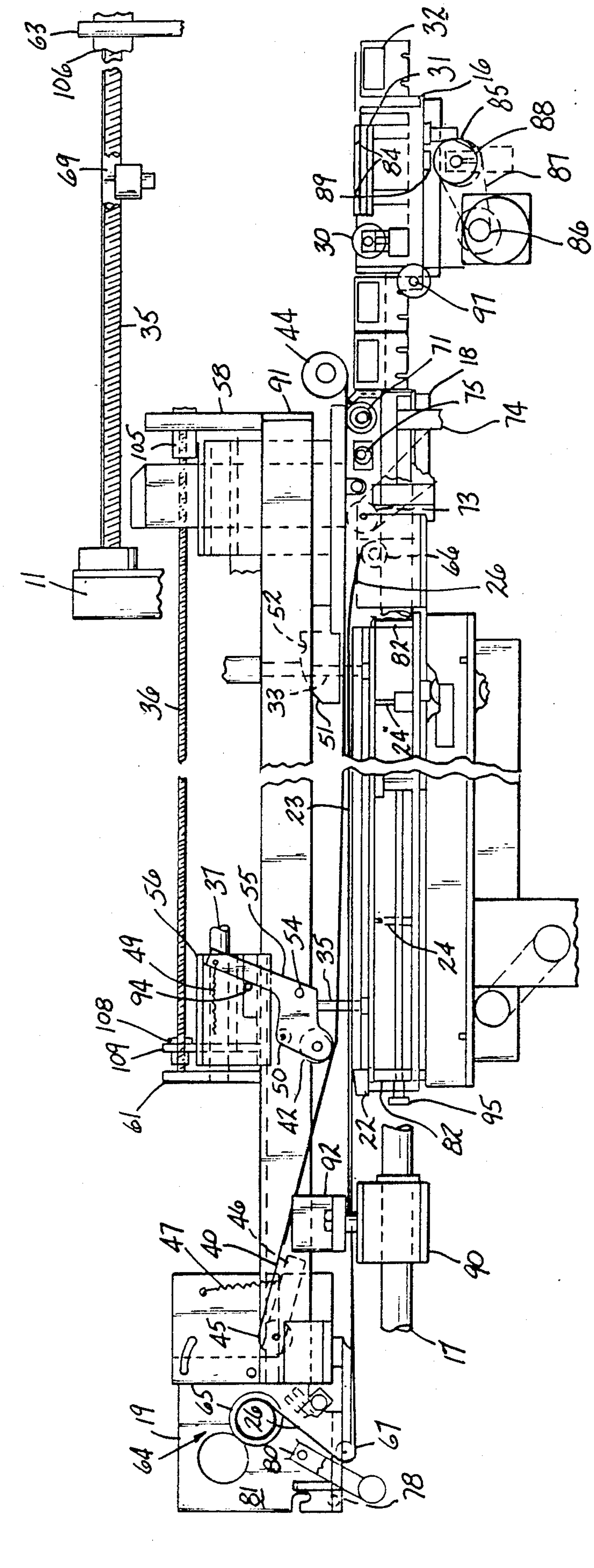
FIG. 5 is an enlarged side elevational view of the apparatus at the beginning of the transfer cycle transferring the developed image from the electrostatic master to the receiving surface.

FIGS. 2–4 show the progression of the transfer means 53, which includes transfer roller 42 and carrier web backing means or backing plate 41, as it is driven in the first direction through charging and the development cycle. Development or toning station 16 is maintained in the raised position during this time by eccentrically shaped toning station cam 85 being in the raised position shown so that the cam 85 forces up against cam receiving plate 89. Cam 85, as best seen in FIGS. 2 and 3, is rotated between its off-centered raised position and its lowered position by a rotational clutch 88, drive chain 87 and cam drive sprocket 86. Once transfer roller 42, moving in the first direction, has passed over development electrode 31, and depressant corona 29, bearing stop block 57 strikes retractable pin 62, as seen in FIGS. 3 and 4 to hold the backing plate 41 stationary opposite or over the development station 16. At this time the transfer roller 42 separates from the web backing plate 41.

The separation is effected by the master transport assembly 34 being driven by the master transport assembly drive motor 106 and its associated main drive screw shaft 35 until the stop block 57, with its bearing 39, contact retractable pin 62, whose air cylinder 96 of FIG. 1 is mounted to an angle iron support rail 69. Transfer roller bearings 56 are driven by transfer roller drive screw rod 36 via drive screw 108 and its associated transfer roller drive bracket 109 until the pivot arms 55 are driven with bearings 56 into contact with stop pins 94. This causes the pivot arms 55, only one of which is shown and which are spring loaded by tensioning springs 49, to rotate about pins 54, thereby causing the transfer roller guide means 50 to raise up out of retention grooves 52, best seen in FIGS. 4 and 5. Carrier web backing plate 41 and its attached ramp plates 51 are held in place by the contact of stop block 57 with retractable pin 62 as the master transport assembly 34 is driven in the first direction by drive screw shaft 35 and its drive motor 106 toward platen 22 until the master transport assembly's stop bracket 38 contacts it. Although there are two transfer roller bearings 56, pivot arms 55, tensioning springs 49, pins 54, retention grooves 52 and ramp plates 51, only one of each are shown in the FIGURES since the FIGURES are side views.

Until this separation the transfer roller 42, with its guide roller 50, remains seated in the retention groove 52 of ramp plate 51. After separation, the transfer roller 42 is held in its raised position by being driven against contact pin 94, as seen in FIGS. 3 and 4. The entire transfer means, indicated generally by the numeral 53 in FIGS. 2 and 3, is driven along bearing support shaft 37 by transfer roller drive screw rod 36. Bearing support shaft 37 is reinforced by reinforcement member 43.

The engagement of bearing stop block 57 with retractable pin 62, and the subsequent separation of the transfer roller 42 and the web backing plate 41, causes the web backing plate 41 to keep the carrier web 40 generally flat and a uniform distance from the toning station 16 during the entire development cycle. During the development cycle, excess solvent is removed from the area around the developed image by the reversing roller 30, in conjunction with the depressant corona 29. The excessive non-polar insulating solvent removed from around the developed image before transfer is directed into a collection pipe 74, which directs it to a central collection tank (not shown). Upon completion of the development cycle, retractable pin 62 is retracted upwardly to allow web backing plate 41 to continue to traverse in the first direction until it is directly over cleaning station 18.

During this portion of the operation of apparatus 10, the cleaning station 18 is in a lowered position so that the cleaning roller 71 and the web wiper 77 do not interfere with the master 48 as it is enroute to the transfer operation. Although not specifically shown, cleaning roller 71 is driven by drive roller 73 (FIGS. 2 and 3). After the image has been transferred to the conductive receiving surface 23, the cleaning station 18 is cammed to a raised position by cam 75 (FIGS. 2 and 3) utilizing a rotational clutch (not shown).

Prior to the image transfer, wicking station 19 applies a layer of liquid containing non-polar insulating solvent to the receiving surface 23 of FIG. 1. Gap spacing and charging strips 26 of FIGS. 1–3, preferably about 5 mils thick and formed of Mylar ® plastic coated with aluminum on the bottom surface, are placed along opposing sides of the receiving surface 23 by dispensing apparatus 64 as the master transport assembly 34 passes in the first direction over the receiving surface 23 on the platen 22. The gap spacing and charging strips 26 are played out along the two opposing side edges of the conductive receiving surface 23, as is best seen in FIG. 2, by a gap spacing strip tensioning spool 65, a strip dispensing roller 66 and a guide and tensioning roller 67. As the gap spacing strips 26 are fed out, non-polar insulating solvent is applied to the receiving surface 23 (not shown) by spray bar 78. Roller 79 spreads out the solvent to ensure that a uniform layer is applied to the receiving surface 23. Pivotable roller bracket arm 80, mounted to the wicking station side sheet 81, controls the positioning of roller 79. An air knife 76 can also be utilized after image transfer to remove the excess solvent on the conductive receiving surface 23.

The master transport assembly 34 of FIG. 5 stops when the master 48 on the carrier web means 40 is positioned precisely over the conductive receiving surface 23 on the platen 22, so that the master 48 precisely overlies the receiving surface 23. The transfer roller 42 is then lowered into position, so it is ready to perform the transfer operation which is accomplished by traversing on the top side of the carrier web means 40 in the opposing second direction.

Figure 8:
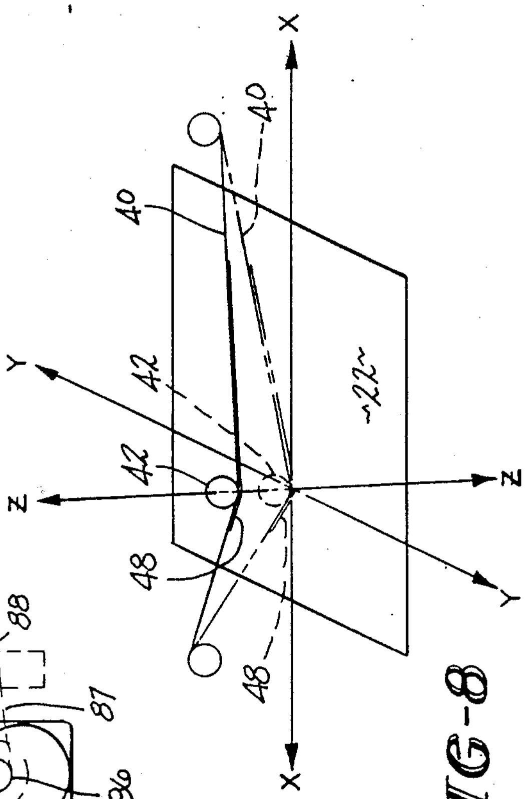
FIG. 8 is a diagrammatical illustration showing the only movement between the developed master and the receiving surface is in the vertical direction along the Z axis and that no movement occurs in the horizontal X and Y planes.

As seen in FIG. 2, the master transport assembly 34 has electrically grounded web tensioning roller means 45 mounted on an idler arm 46 that is movable by means of the spring 47 to cause the roller means 45 to turn about a suitable support, such as a bearing (not shown), to maintain the proper tension on the carrier web means 40. Once properly positioned, the transfer roller 42 contacts the back or upper side of the carrier web means 40 and traverses in the opposing second direction a distance equal to at least the length of the master 48 to bring the master adjacent to, but not in contact with, the conductive receiving surface 23 at discrete points along the entire length of the master 48. The only movement of the master 48 on the carrier web means 40 is in the vertical direction along the Z axis, as is diagrammatically illustrated in FIG. 8.

Figure 6:
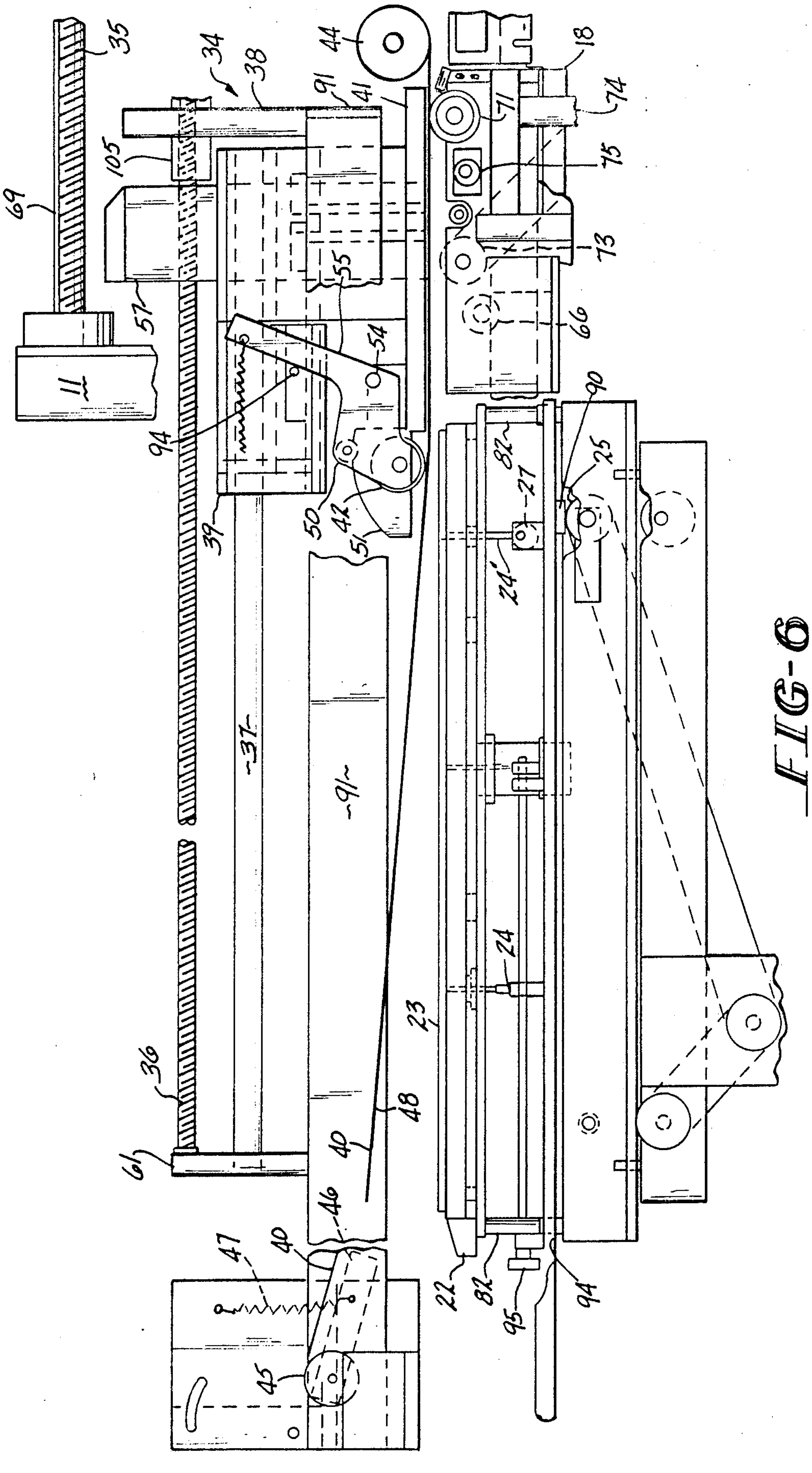
FIG. 6 is an enlarged side elevational view of the apparatus at the end of the transfer cycle after the developed image has been transferred from the electrostatic master to the receiving surface.

FIGS. 5 and 6 show the position of the transfer roller 42 at the beginning and at the end of the transfer operation in contact with the carrier web means 40. FIG. 5 shows the apparatus at the beginning of the transfer cycle with the transfer roller 42 in its lowered position. FIG. 6 also shows how the transfer roller guide means 50 rides up the ramp plate 51 into the retention groove 52 at the end of the transfer operation.

Figure 7:
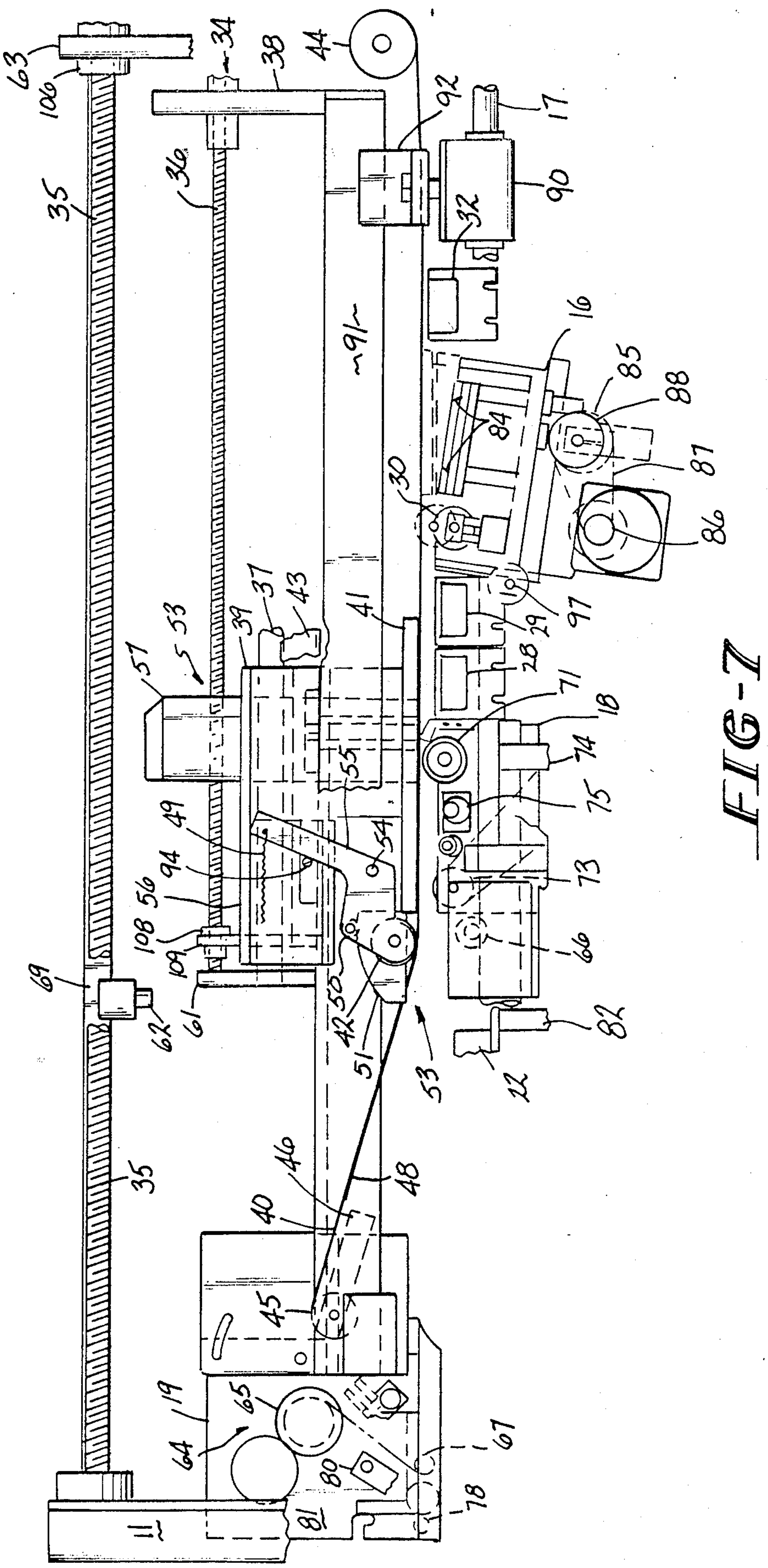
FIG. 7 is an enlarged side elevational view of the apparatus showing a position at the end of the cleaning cycle.

Web retention roller means 44 of FIG. 7 applies the high voltage charge, varying from about 200 to about 3,000 volts, dependent upon the master, to the conductive surface of the carrier web means 40 to pick up and retain the master 48 on the carrier web means 40. Web retention roller means 44 combines with the tensioning roller means 45 and the transfer roller 42 to permit the transfer roller 42 to smooth out the carrier web means 40 and the master 48 to obtain a smooth, continuous surface that is free of ripples.

As is best seen in FIG. 5, the transfer roller 42 establishes with the carrier web means 40 a leading angle and trailing angle. These leading and trailing angles vary as the transfer roller traverses the entire length of the master 48. The leading angle and the trailing angle will vary in angulation depending upon the diameter of the transfer roller, the speed of travel of the transfer roller across the carrier web means 40, the length of the master 48, the size of the transfer gap between the master 48 and the receiving surface 23, and the type of toner used. The leading angle can vary from between about 1° to about 10° from the front at the beginning of contact with the master 48 about 6° to about 30° at the end of the master 48. Similarly, the trailing angle can vary from between about 45° down to about 22½° at the beginning of contact with the master 48 to about 22½° to about 10° at the end of the master 48. For example, with a 1½ inch diameter transfer roller, a 24 inch long master, a transfer roller traversing speed of about 10 inches per second and about a 5 mil thick transfer gap, the leading angle was about 1° at the beginning of contact with the master 48 and about 6° at the end of the master 48. The trailing angle at these two locations varied between about 22½° to about 12°. As a general guide, it is not desirable to use a larger than necessary angle for the leading and trailing angles.

The transfer roller 42, with the web tensioning roller means 45 and the web retention roller means 44, maintain a uniform tension on the carrier web means 40 to ensure discrete point to point transfer of the developed image on the master to the conductive receiving surface through a transfer window and to avoid entrapping air and excessive non-polar insulating liquid solvent between the two surfaces. The transfer window is that area on the master 48 which the diameter of the transfer roller brings into transfer proximity for discrete point transfer with the receiving surface 23.

The finite gap between the two surfaces is filled with the non-polar insulating solvent across which the toner particles travel.

The electrostatic field between the master 48 and the conductive receiving surface 23 is established by the application of a charge on the conductive receiving surface 23. This charge is supplied by an independent high voltage source (not shown) through the aluminum coating on the gap spacing and charging strips 26 of FIGS. 1–5. This electrostatic field permits the transfer of the developed image on the master 48 to the conductive receiving surface 23.

FIG. 7 shows the position of the master transport assembly 34 with the transfer means 53 and its carrier means backing plate 41 held stationary in position opposite the cleaning station 18. The cleaning station 18 is shown in its raised position, while the development station 16 is shown pivoted about pin 97 to its lowered position and clear of the path of the master 48 and the flexible carrier means 40. The development station is shown in dotted lines in its raised position.

In operation, a master 48 is placed on the platen 22 and registered. The permanent master 48 has previously had its photosensitive surface exposed to obtain the difference in electrical resistivity required for the process by the cross-linking of the exposed surface area to obtain the permanent latent image desired. This cross-linked exposed surface area has increased electrical resistivity.

A dummy receiving surface or punch guide (not shown) that is the same thickness as the receiving surface 23 is placed on the platen 22. The master 48 is then placed atop the dummy receiving surface. The four alignment pins 24 are then raised to register the master 48 and the dummy receiving surface to the platen 22. Once this is properly registered via the pins 24, the vacuum pump apparatus 15 is activated to hold both the dummy receiving surface and the master 48 in place.

The master transport assembly 34 positions the carrier web 40 over the master 48 and the carrier web 40 is registered to the platen 22 and the master 48, with the use of platen pins 24 and alignment pins 33. An electrical charge is applied to the conductive surface of the flexible carrier web 40 to pick up and hold the master 48 in the registered position on the web 40. The master transport assembly 34 then return the carrier web 40 and the master 48 to the right-most position of FIG. 1 on support frame 11.

The board or conductive receiving surface feed unit 21 then picks up a receiving surface 23 and places it on the platen 22 where it is registered in position via the desired alignment pins 24 and 24' and, depending upon the size of the receiving surface 23, pins 24" or 24'". Once properly positioned, the master transport assembly 34 begins its traverse in the first direction along guide rails 17 with the master 48, bringing the master 48 over the charge corona 32 to have the master 48 charged. The master 48 and the carrier web 40 continue traversing in the first direction to bring the master 48 over the development station 16, with its development electrode 31. The flexible carrier web backing means or plate 41 remains positioned over the development electrode 31 as the transfer means 53 has transfer roller 42 separate from the retention groove 52 at the top of ramp plate 51 after stop block 57 contacts retractable pin 62. The master transport assembly 34 continues to transport the master 48 over the reversing roller 30 and depressant corona 29.

The disengagement of the transfer roller 42 from the retention groove 52 allows the flexible carrier means or web backing plate 41 to be driven in the opposite direction against stop bracket 38. This is accomplished by actuating the retractable stop pin 62, mounted to the support bracket 69, in front of stop block 57 as the master transport assembly 34 is driven in the first direction towards the platen 22 of FIG. 1 by the main drive screw shaft 35. After the web backing plate 41 abuts stop bracket 38, the retractable stop pin 69 is retracted to a raised position and a rotational clutch is disengaged and permits the development station 16 to pivot downwardly about a shaft to a lowered position (not shown). The flexible carrier means or web backing plate 41 is now in the transfer position. The transfer roller 42 is then in position to traverse the flexible carrier means 40 in the opposing second direction to effect the electrostatic transfer from the master 48 to the receiving surface 23.

The receiving surface 23 is wicked by wicking station 19, applying non-polar insulating solvent to it from spray bar 76, as the gap spacing strips 26 are fed out along its opposing edges. A charge is then applied to the receiving surface 23, and the developed image on the permanent master 48 and the receiving surface 23 are then ready for image transfer utilizing the transfer roller 42.

The transfer roller 42 traverses the entire length of the master 48 by being driven in the opposing second direction along bearing support shafts 37 of FIG. 5 (only one of which is shown) by a transfer roller drive motor 105, turning transfer roller drive screw rod 36, which drives screw 108 and its associated transfer roller drive bracket 109. Once the transfer roller 42 has traversed the entire length, guide roller 50 rides up the ramp plate 51 into the retention groove 52 as the bearing stop block 39 engages the stop bracket 38. The ramp plate 51 is suitably connected to carrier backing means or web backing plate 41. This positioning of the guide roller 50 continues until the entire master transport assembly 34 is moved back in the opposing second direction to the start position seen in FIG. 1 and the cleaning operation described below has been completed. The riding of the guide rollers 50 up the ramp plate 51 cause the pivot arms 55, connected to bearing 56 to pivot about pins 54 to raise the transfer roller 42 up and allow the carrier web means 40 to be flat against the web backing plate 41.

Once the transfer operation has been completed the master cleaning station 18 of FIG. 6 is cammed up to its raised position by the aforementioned cam 75 to permit the master 48 to be cleaned prior to the next image transfer. Cleaning station 18 is then raised against carrier web 40, which is in contact with web backing plate 41. Cleaning station 18 employs a cleaning roller 71, and a spray bar (not shown) to apply a coating of solvent to the master 48 and then remove any excess. A web wiper 77 may also be used to clean the master 48 as part of the cleaning station 18 after image transfer has occurred. Cleaning occurs by movement of the master 48 and the master transport assembly in the opposing second direction after the transfer roller 42 has been reseated in retention groove 52.

Web backing plate 41 and the carried transfer roller 42 are held over the cleaning station 18 during the entire cleaning cycle by the drive motor 105 turning transfer roller drive screw rod 36 to drive the transfer roller 42 and web backing plate 41 towards stop plate 61 of FIG. 1 as master transport assembly 34 is driven at the same speed in the opposing second direction to its starting position against master transport assembly stop plate 63 of FIG. 7. The master 48 is discharged by discharge corona 28 prior to the master transport assembly 34 returning to its starting position. The imaged receiving surface 23 is then removed by pickup apparatus 20 and platen 22 is ready for receipt of another receiving surface 23 from feeder unit 21.

The use of the term permanent latent image with respect to the master 48 is intended to connote that the image is durable, lasting over a long period of time, as well as not changing in the high quality and resolution of its transferred image. For example, the permanent latent image can last months and, perhaps, years once exposed into the electrostatically imageable surface of the master 48, under proper storage conditions. Additionally, as many as 5,000 images have been transferred from a single master.

While the preferred structure in which the principles of the present invention have been incorporated is shown and described above, it is to be understood that the invention is not to be limited to the particular details thus presented but, in fact, widely different means may be employed in the practice of the broader aspects of this invention.

For example, the registration method and apparatus is equally well employable with conductive or nonconductive receiving surfaces. The scope of the appended claims is intended to encompass all obvious changes in the details, materials and arrangements of parts that will occur to one of ordinary skill in the art upon a reading of this disclosure.

What is claimed is:

1. Apparatus for the electrostatic transfer of a developed image from a master having a permanent latent image therein to a receiving surface comprising in combination:

a. a supporting frame;

b. flexible carrier means connected to the frame adapted to electrostatically pick up and retain the master;

c. supporting surface means for supporting the master for pick up onto the flexible carrier means and for supporting the receiving surface during image transfer;

d. charging means connected to the frame farthest from the support surface means for charging the master while the master is retained on the flexible carrier means;

e. developing means connected to the frame intermediate the supporting surface means and the charging means for developing the charged master with toner;

f. cleaning means connected to the frame intermediate the supporting surface means and the developing means for cleaning the master after image transfer;

g. master transport means movably connected to the frame having the flexible carrier means mounted thereto for transporting the flexible carrier means in a first generally horizontal direction over the supporting surface means and in an opposing second direction toward the charging means; and h. transfer means movably mounted to the master transport means effective to transfer the developed image on the master to the receiving surface while moving in the opposing second direction.

2. The apparatus according to claim 1 wherein the developing of the charged master occurs while the master retained on the flexible carrier means is transported in the first direction.

3. The apparatus according to claim 2 wherein spacer means are placed on the receiving surface so the master contacts the spacer means during image transfer.

4. The apparatus according to claim 3 wherein the transfer means moves the flexible carrier means with the master retained thereon in a generally vertical direction during image transfer.

5. The apparatus according to claim 4 wherein the master retained on the carrier means is held stationary in a fixed and registered position with no relative motion in the horizontal direction between the master and the receiving surface during image transfer.

6. The apparatus according to claim 5 wherein the transfer means includes a roller that traverses one surface of the carrier means to move the carrier means in the generally vertical direction to bring the master into contact with the spacer means, the master being retained on the opposing surface of the carrier means.

7. The apparatus according to claim 6 wherein the spacer means further comprise strips that are placed on the receiving surface.

8. The apparatus according to claim 7 wherein the master transport means further includes a drive motor to move the flexible carrier means in the first generally horizontal direction and in the opposing second direction.

9. The apparatus according to claim 8 wherein the transfer means further includes a drive motor to move the transfer means in the first generally horizontal direction and in the opposing second direction.

10. The apparatus according to claim 7 wherein the supporting frame has a depressant charge means for better defining the developed image intermediate the developing means and the cleaning means.

11. The apparatus according to claim 10 wherein the supporting frame has a discharge means for discharging charged areas on the developed master after cleaning the master, the discharge means being intermediate the depressant charge means and the cleaning means.

12. The apparatus according to claim 7 wherein the supporting frame has stop means that engage the transfer means to retain the transfer means opposite the developing means while the master and the flexible carrier means are transported in the first direction, the transfer means further having flexible carrier means backing means that contacts the one surface of the carrier means while being held opposite the developing means.

13. The apparatus according to claim 12 wherein the flexible carrier means backing means is retained opposite the charging means at the same time as the backing means is retained opposite the developing means by the stop means.

14. The apparatus according to claim 13 wherein the flexible carrier means backing means is driven in the first direction while the master and the flexible carrier means are transported in the opposing second direction to maintain the flexible carrier backing means opposite the cleaning means.

15. The apparatus according to claim 14 wherein the flexible carrier means is a tensioned web.

16. The apparatus according to claim 15 wherein the transfer means includes a transfer roller which separates from the flexible carrier means backing means when the transfer means has been engaged by the stop means while the master and the flexible carrier means are transported in the first direction.

17. The apparatus according to claim 16 wherein the flexible carrier means backing means comprises a generally planar plate.

18. The apparatus according to claim 17 wherein the supporting surface means comprises a generally hollow platen connected to a vacuum system to help retain the receiving surface in place thereon.

19. The apparatus according to claim 18 wherein the charging means is a corona electrode.

20. The apparatus according to claim 19 wherein the developing means comprises a developing electrode and liquid toner dispenser.

21. The apparatus according to claim 20 wherein the developing means further comprises a reversing roller.

22. The apparatus according to claim 21 wherein the cleaning means comprises a cleaning roller and a wiper.

23. A method of electrostatically transferring a developed latent image from a master with a permanent latent image exposed therein to a receiving surface, the master being supported by carrier means comprising the steps of:

a. transporting the master in a first generally horizontal direction while charging and developing the image on the master;

b. transferring the developed image on the master to the receiving surface by transfer means traveling in an opposing second direction; and c. transporting a carrier means backing means in the first direction to effect cleaning of the master while the master is transported on the carrier means in the opposing second direction.

24. The method according to claim 23 further comprising the step of positioning and retaining the carrier means backing means opposite developing means for developing the master while the master is transported on the carrier means in the first direction.

25. The method according to claim 24 further comprising positioning and retaining the carrier means backing means opposite charging means for charging the master at the same time the master is developed.

26. The method according to claim 24 further comprising transporting the master opposite depressant charge means for better defining the developed image after developing the master while the master moves in the first direction.

27. The method according to claim 26 further comprising transporting the master opposite the discharge means for discharging the master after the cleaning while the master moves in the second direction.

28. The method according to claim 23 further comprising applying a coating of nonpolar insulating solvent to the receiving surface prior to transporting the master opposite the receiving surface while the master is transported in the first direction.

29. The method according to claim 28 further comprising registering the master on the carrier means in a fixed position opposite the receiving surface prior to transferring the developed image.

30. The method according to claim 29 further comprising positioning and retaining the carrier means backing means opposite cleaning means for cleaning the master after the developed image has been transferred while the carrier means and the master are transported in the second direction.

31. The method according to claim 23 further comprising registering and retaining in position the master on a supporting surface prior to supporting the master by the carrier means.

32. The method according to claim 31 further comprising transporting the carrier means in the first direction opposite the registered master and registering and fixing the carrier means in position opposite the master.

33. The method according to claim 32 further comprising electrostatically picking up and retaining the master on the carrier means by the transfer means traversing the carrier means in the opposing second direction.

34. The method according to claim 33 further comprising transporting the electrostatically picked up and retained master on the carrier means in the opposing second direction prior to charging and developing the master.

35. The method according to claim 23 further comprising placing spacer means on the receiving surface while the master is transported in the first direction.

36. The method according to claim 23 further comprising holding the master stationary in a fixed and registered position on the carrier means with no relative motion in the horizontal direction between the master and the receiving surface during transfer of the developed image.

37. The method according to claim 36 further comprising moving the master and the carrier means in a generally vertical direction while the transfer means traverses the carrier means in the opposing second direction.

* * * * *